J. S. MUELLER.
SPLIT POLE INDUCTION MOTOR.
APPLICATION FILED JUNE 24, 1907.
1,164,302. Patented Dec. 14, 1915.
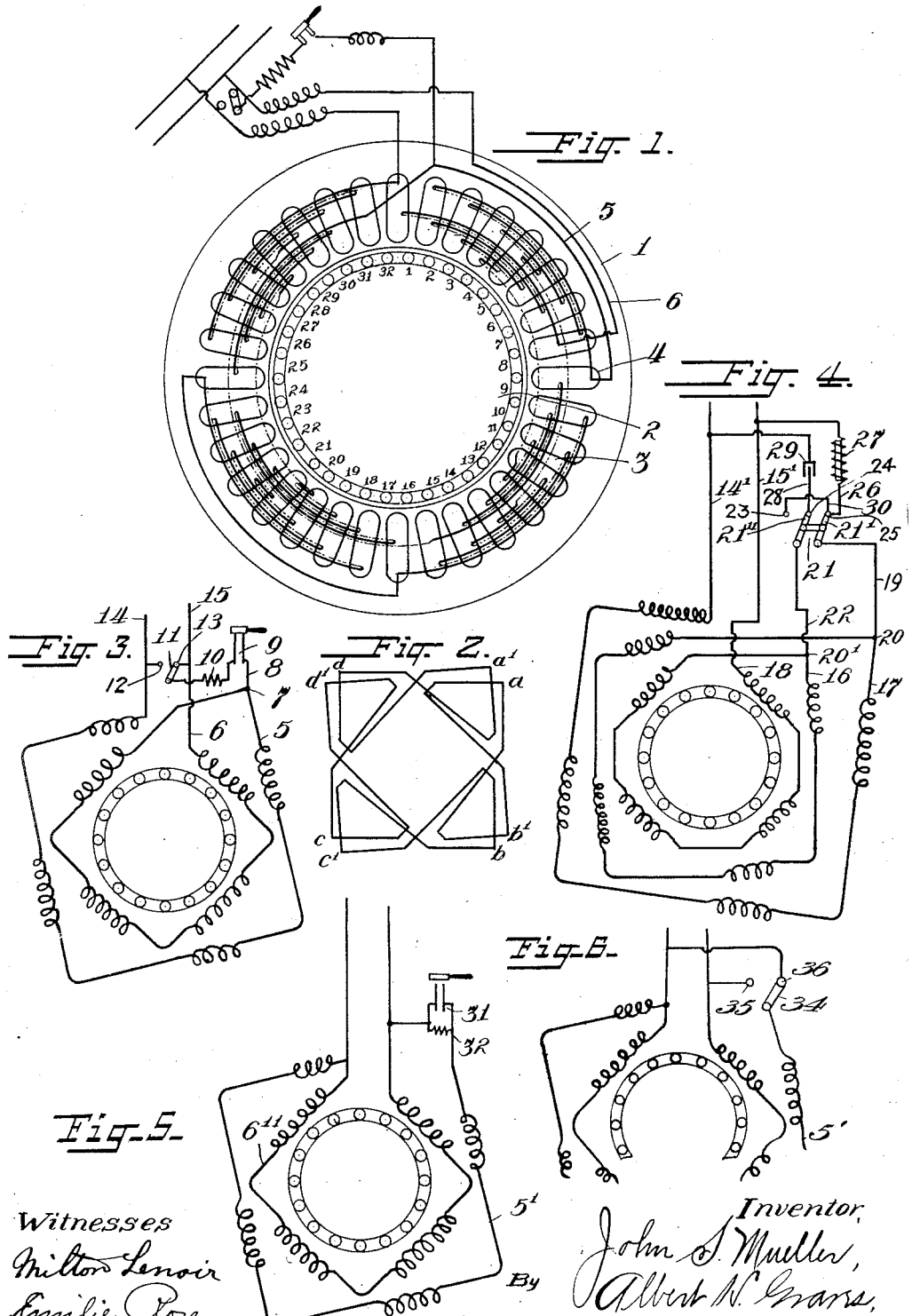
Witnesses
Milton Lenoir
Emilie Rose
Inventor,
John S. Mueller,
By Albert N. Grass,
Attorney.

UNITED STATES PATENT OFFICE.

JOHN S. MUELLER, OF CHICAGO, ILLINOIS.

SPLIT-POLE INDUCTION-MOTOR.

1,164,302.             Specification of Letters Patent.      Patented Dec. 14, 1915.

Application filed June 24, 1907. Serial No. 380,429.

*To all whom it may concern:*

Be it known that I, JOHN S. MUELLER, a citizen of the United States, residing at Chicago, in the county of Cook and State of Illinois, have invented certain new and useful Improvements in Split-Pole Induction-Motors, of which the following is a specification.

This invention relates to improvements in split pole induction motors, and as to its chief feature refers more particularly to a new form or arrangement of windings of the primary member, which produces what may aptly be termed a split-pole motor, its important characteristic being that it is self-starting under split-phase excitation, but operates as a true single-phase motor under single-phase current.

Among the salient objects of the invention are to provide a motor which will be self-starting and nevertheless be of maximum efficiency, this general object being attained by utilizing parts of the main windings to bring about a temporary displacement of the poles and thus produce a starting torque, but utilizing the same parts in conjunction with the rest of the windings during the regular operation of the motor; to provide a construction which is devoid of auxiliary windings or starting coils thereby enabling all or practically all of the field space to be utilized for main windings; to provide in a motor of the character described means for simply and conveniently effecting a reversal of rotation of the motor; and in general to provide a simple and effective machine of the character referred to.

In the accompanying drawings—Figure 1 is a view partly diagrammatic and partly mechanic showing one embodiment of the invention; Figs. 2 and 3 are purely diagrammatic views of the same motor shown in Fig. 1; Fig. 4 is a diagrammatic view showing a modified form; Fig. 5 is a diagrammatic view showing a still further modification. Fig. 6 is a view similar to Fig. 5 showing another modification.

The advantage of single phase induction motors over polyphase machines, in the matter of simplicity of windings and line connections are well understood, but the most serious disadvantage of the single phase machine is that, without the provision of some special auxiliary means, it is not self-starting. It is of course, obvious that if the main or regular windings of the primary member of the motor can be so arranged that they may be utilized in the normal way for normal running and also be capable of producing a starting torque for starting and bringing the motor up to speed, an important advantage will have been achieved, since dispensing with special starting windings leaves the entire winding space of the motor ring to be occupied by main windings, thus giving a motor of maximum efficiency, while at the same time the avoidance of the use of starting windings, which are ordinarily made of high resistance, greatly reduces the danger of overheating and burning out. I accomplish the important end of making a motor polyphase, so to speak, for starting purposes, and monophase for normal operation, by so arranging the windings that while starting the magnetic poles will be pitch-displaced more or less with reference to the true magnetic poles induced during normal operation of the motor. This I accomplish by making the windings of the primary in two or more parts, the coils of the several parts being partially overlapped or superposed and partially offset or pitch-displaced relatively to each other to form coil groups, which when excited by single phase current act together to induce the monophase poles, but which when separately excited under split-phase current induce individual separate poles which are circumferentially or pitch-displaced relatively to the normal poles and thus produce a starting torque, *i. e.* a rotating field. I so arrange the groups of coils that contiguous groups do not overlap, or at least do not overlap to such extent as to seriously interfere in inductive effect with each other.

It will be obvious that the invention is capable of embodiment in motors having their windings considerably varied yet always embodying the principles above set forth. For example, the primary member may have a two-part winding, or it may have a winding of three or more parts, the coils of the several windings being in each instance arranged to form pole-inducing groups acting in common under single phase current and separately under split-phase current. So also the means of producing current of different phase for starting purposes may be varied, as will hereinafter appear.

Describing first one of the simplest, and a preferred form of embodying the invention, and referring first to Fig. 1, 1 designates as a whole a ring-shaped motor member constituting in the embodiment shown the primary and stator of the machine, and 2 designates the rotor, which is preferably and as shown of the ordinary closed circuit "squirrel cage" type. In this figure the windings are shown diagrammatically. The particular ring shown is constructed to form 32 pole projections or teeth, and corresponding intervening winding slots or openings 4. The windings are so disposed as to produce a pyramidal inductive effect and to induce, as shown, four principal poles, of which those pole-projections numbered 4—5, 12—13, 20—21 and 28—29 constitute the pole centers or fields of greatest magnetic density during normal operation. Referring to the winding shown in the diagram as the radially outer one, designated 5, the first one or more turns of each coil of this winding includes seven teeth, the next turn or series of turns two less, i. e. five teeth, the next turn or series of turns three teeth, and the final turn or series of turns one tooth; which pyramidal windings acting alone would induce pole centers coincident with the teeth numbered 5, 13, 21 and 29, respectively. The second or inner winding, designated as a whole 6, is wound in a precisely similar manner, except that it is circumferentially offset one tooth, so that the magnetic centers of the pyramidal wound coils of this winding would be coincident with the teeth 4, 12, 20 and 28. The inductive effect of the two windings of the motor shown in Fig. 1 when acting separately is shown diagrammatically in Fig. 2, in which the induced peaks designated $a$, $b$, $c$, $d$ and $a'$, $b'$, $c'$ and $d'$ correspond respectively to the coils of the first and second windings.

It will be noted that with the windings arranged as described, the angular extremities of adjacent groups of coils just meet each other and do not overlap, although they might obviously be made to overlap a tooth or two without very serious deterioration of the motor efficiency or they might be angularly separated by one or more teeth. Of course also, the angular displacement of one set of coils relatively to the other or others may be greater than that shown. It is essential, however, that the coils of the different windings be so arranged as to act unitedly under single phase current to produce poles severally common to each group, and it is also essential that the windings be angularly disposed relatively to each other so that when excited out of phase with each other they induce individual poles.

Since one of the important objects of using a monophase motor, instead of a polyphase, is to eliminate anything more than a single pair of supply mains, the greatest advantage will be secured by using in conjunction with a motor wound in accordance with the present invention, some phase splitting device, although it is to be observed that the motor would, of course, work if operated under true polyphase current, when properly connected.

There are various known ways of phase splitting which are capable of use in connection with a motor constructed to embody the present invention. In the arrangement shown in Fig. 1, and also that shown in diagrammatic Fig. 3, which is the same thing as Fig. 1 shown somewhat more simply, the two windings are normally in series with each other across the mains, and the phase splitting is accomplished by partially or completely short circuiting one or the other of the windings, depending upon the direction the motor is to be started. To this end, from a point 7 on the conductor which connects the two windings, a shunt conductor 8 is led to and through a cut-out 9, thence through a resistance 10 to a switch 11 which may be closed with either of two contacts 12 or 13, which are respectively connected with the two mains 14 and 15. With the switch 11 closed with contact 13 and the cut out 9 closed, it will be seen that the outer winding 5 is connected directly across the mains in a manner to short circuit the inner winding 6, except to the extent that the resistance 10 shunts current through the latter. When so connected the current flowing through the winding 5 induces current in the winding 6 lagging behind that in the winding 5. Current is also induced in the windings of the rotor 2 and this latter current lags still farther behind that in 6. The actual current in winding 6 is the resultant of the two induced currents. It will be obvious that by varying the resistance 10 the phase of this lagging current can be modified to correspond to the pitch distance between the companion magnetic poles induced by the two windings when acting separately. It is to be observed that were the resistance 10 entirely omitted and the winding 5 connected directly across the mains the phase would be split, i. e. there would be lagging current induced in the winding 6 and the rotor windings. It is obvious that by simply shifting the switch 11 from engagement with contact 13 to engagement with contact 12 the relations of the two windings to each other will be exactly reversed and accordingly the motor will run in the opposite direction.

In Fig. 4 I have shown diagrammatically one manner of connecting up a motor having a primary provided with three windings instead of two. In this diagram it is to be understood that there is represented a primary having three windings, the coils of which are grouped so as to produce a pyramidal induction effect when acting together and to induce individual, pitch-displaced poles when acting separately under split phase current. That is to say, the coils of the central winding 16 will be located concentrically (electrically) with the main or common poles, and the coils of the outer and inner windings 17 and 18 will be respectively offset partially at each side of the corresponding coils of the winding 16. In the diagram shown in Fig. 4 will be seen that, disregarding the shunt connections, the three windings are connected in series across the mains 14' and 15'. A shunt conductor 19 connects from a point 20 between the windings 16 and 17 and leads thence to and through one bar 21' of a two-bar switch 21, while a second shunt conductor 22 leads from a point 20' between the windings 16 and 18 to the other bar 21'' of said switch 21. The bars of the switch are adapted to coöperate with three fixed contacts 23, 24 and 25, as shown. From point 25 a conductor 26 leads to and through an impedance coil 27 and thence to the main 15'. From point 24 another conductor 28 leads to and through a condenser 29 and thence to the main 14'. A cross connecting conductor 30 connecting points 23 and 25 enables the relations of the windings to be so changed that the condenser and impedance are each bridged across one winding only instead of two, by simply shifting the switch. In the diagram the switch is shown in starting position and it will be seen that the outermost winding 17 is connected across the mains through the impedance 27 in such manner as to cause a lagging in the current passing through the winding, the innermost winding 18 is connected across the mains with the interposed condenser 29 in such manner as to induce a lead in the phase of the current passing therethrough while the intermediate winding 16 is connected on one side through the impedance and on the other side through the condenser so that the phase of the current passing through this winding would be intermediate with reference to the phases of the outer and inner windings. By simply shifting the switch 21 into its other position the relations of the windings would be changed so as to run the motor in the opposite direction. With switch 21 moved to open position, the three windings of the primary will be connected in series across the mains.

In the modifications thus far described the windings have been arranged for connection in series for normal running, but the windings may obviously be so connected as to be arranged in parallel across the mains if so desired.

In Fig. 5 I have shown windings similar to those shown in Figs. 1 and 3 with the connections modified to place the two windings in parallel under normal running. Considering first those parts of the diagram shown in full lines, 31 designates a cut-out interposed in one side of the outer winding 5' or between the latter and the main, and 32 designates a resistance arranged as a shunt across the cut-out. When the cut-out is closed the windings are connected simply in parallel across the two mains. With the cut-out open, however, as shown, the outer winding includes the resistance 32 which will cause the current to lag in that winding, and if this resistance be inductive resistance the lag will be accentuated. The resistance 32, therefore, becomes the phase splitting means which is effective in inducing the desired rotary field.

In Fig. 6 is shown an illustrative way of splitting the phase by short circuiting one winding, the outer one as shown. To this end one side of the winding 5' is connected through a conductor 33 to a switch 34 adapted to be closed with either of two points 35 or 36. When connected with the latter both ends of the winding are connected to the same main, and when connected with point 35 the winding is connected in parallel across the mains. With the one winding short circuited for starting, the current induced therein from the other winding will be of different phase and thus produce the starting torque in substantially the same manner as hereinbefore described in connection with the preceding multiplications.

It will, of course, be understood that a motor embodying my invention may be constructed so as to embody a reversal of the relations between rotor and stator; the rotor being made the primary and provided with slip rings as usual in such cases. It will also be understood that by means of any of the usual expedients the rotor may be relieved of load during starting, and after it has been brought up to speed clutch with a drive shaft or pulley by any usual clutch mechanism (automatic or manual).

While I have herein shown and described simple and practical embodiments of the invention yet I wish it understood that the invention is not limited to these embodiments but on the contrary the claims are to be construed commensurate with the scope of their terms.

I claim as my invention:

1. In combination with a pair of supply mains, an induction motor having a primary motor ring provided with a plurality of windings connected in series with each other and across said mains and each having their coils partly overlapped and partly offset or displaced angularly relatively to each other, a shunt connection extending from an intermediate point in said motor windings back to one of the mains, a phase-modifying device in said shunt, a switch controlling said shunt, and operative connections between said switch and each of the two mains whereby the switch may be alternatively made to connect the shunt with either main.

2. In combination with a pair of supply mains, an induction motor having a primary motor member provided with a plurality of energizing windings, the coils of the several windings being grouped to induce a pole common to and at the magnetic center of each group under single phase excitation, coils of each group being angularly offset relatively to other coils of the group, to induce circumferentially displaced separate poles under split-phase excitation, a switch arranged to control the circuit through said windings, and suitable connections between said switch and each of the two mains whereby the relation of the windings to each other and the mains may be reversed.

3. In combination with a pair of supply mains, an induction motor having a primary motor ring provided with a plurality of windings connected in series with each other and across said mains and each having their coils partly overlapped and partly offset or displaced angularly relatively to each other, a shunt connection extending from an intermediate point in said motor windings back to one of the mains, a switch controlling said shunt, and operative connections between said switch and each of the two mains whereby the switch may be alternatively made to connect the shunt with either main.

4. The combination with an induction motor having two primary windings, of a single resistance, and a switch having a single movable member for connecting said resistance in series with the one or the other of said windings, according to the desired direction of rotation.

5. The combination with an induction motor having two primary windings, of a single phase modifying device, and a switch having a single movable member for associating said device with the one or the other of the said windings, according to the desired direction of rotation.

6. In an induction motor, a motor ring provided with a winding consisting of two or more sections having their coils arranged in pole groups, which groups are partly superposed and partly offset relative to each other, but do not overlap contiguous pole groups, the mean reach circumferentially of the pole groups of each winding section being substantially uniform and the winding sections substantially alike, and suitable connections for at will sending either single or plural phase current through said winding sections.

7. In an induction motor, a motor ring provided with a winding consisting of two or more sections having their coils arranged in pole groups, which groups are severally wound pyramidal fashion and are partly superposed and partly offset relative to each other but do not overlap contiguous pole groups, the mean reach circumferentially of the pole groups of each winding section being substantially uniform and the winding sections substantially alike.

8. In an induction motor, a primary motor member provided with a winding consisting of a plurality of like sections, the coils of which sections are arranged in pole groups and said groups partially superposed and partially offset relative to each other, the coils of each group being wound pyramidal fashion and the coils of contiguous groups non-overlapping.

9. A rotary field motor having a primary member provided with a winding arranged in proximity to the adjacent surface of the secondary member, each pole composed of two or more substantially pyramidal coil groups, each of which groups embraces a like peripheral core space which is less than that obtained by dividing the circumference of the field member by the number of poles, and the pyramidal coil groups forming said poles having their centers offset.

10. In a non-synchronous motor, a field magnet or primary member having a winding, poles of said winding being composed of two or more pyramidal coil groups, each of which groups embraces a peripheral core space, the reach of which is less than the arc distance obtained by dividing the whole circumference by the number of poles, said pyramidal coil groups forming the pole parts being of substantially the same length and form and having their centers offset relative to each other.

11. In a non-synchronous motor, a field magnet or primary member having a winding, each of the poles of said winding being composed of two or more pyramidal coil groups, each coil group of which embraces a peripheral core space which differs from the arc resulting from dividing the whole circumference by the number of poles, said coil parts being substantially alike in form and dimensions, the coil groups of each pole having their centers offset and symmetrically arranged relative to each other, with their sides in close proximity to the adjacent surface of the armature or secondary member.

12. In a non-synchronous motor, a field magnet or primary member having a winding, each of the poles of said winding being composed of two or more pyramidally wound coil groups partly superposed and which combinedly embrace a peripheral core space which is equal to the arc formed by dividing the circumference by the number of poles, in combination with an armature or secondary member arranged in inductive relation thereto.

JOHN S. MUELLER.

Witnesses:
 ALBERT H. GRAVES,
 FRANK L. BELKNAP.